United States Patent
Arbuckle et al.

(10) Patent No.: US 6,868,659 B2
(45) Date of Patent: Mar. 22, 2005

(54) NATIVE SEED HARVESTER WITH CAM DESIGN

(75) Inventors: Lee Arbuckle, Billings, MT (US); William E. Larsen, Bozeman, MT (US); Brian W. Sindelar, Belgrade, MT (US); Brad W. Wright, Belgrade, MT (US); Stephen M. Sanford, Bozeman, MT (US)

(73) Assignee: Arbuckle Ranch, Inc., Billings, MT (US)

(*) Notice: Subject to any disclaimer, the term of this patent is extended or adjusted under 35 U.S.C. 154(b) by 0 days.

(21) Appl. No.: 10/460,533

(22) Filed: Jun. 12, 2003

(65) Prior Publication Data

US 2003/0213222 A1 Nov. 20, 2003

Related U.S. Application Data

(63) Continuation-in-part of application No. 09/771,492, filed on Jan. 26, 2001, now Pat. No. 6,640,530.

(51) Int. Cl.[7] ............................................. A01D 45/30
(52) U.S. Cl. ...................................................... 56/130
(58) Field of Search .......................... 56/126, 127, 128, 56/129, 130, 219, 220, 221, 226

(56) References Cited

U.S. PATENT DOCUMENTS

| | | | | |
|---|---|---|---|---|
| 2,724,942 A | * | 11/1955 | Smith | 56/219 |
| 3,638,408 A | * | 2/1972 | Swanson | 56/219 |
| 3,955,346 A | * | 5/1976 | Coon | 56/28 |
| 4,303,373 A | * | 12/1981 | Polhemus | 415/206 |
| 4,353,201 A | * | 10/1982 | Pierce et al. | 56/364 |
| 4,498,278 A | | 2/1985 | Friesen | |
| 4,753,296 A | | 6/1988 | Kruithoff | |
| 4,790,127 A | | 12/1988 | Grant et al. | |
| 4,815,261 A | * | 3/1989 | Anderson | 56/126 |
| 4,951,453 A | * | 8/1990 | Klinner | 56/364 |
| 5,287,685 A | * | 2/1994 | Morgan | 56/126 |
| 5,369,944 A | | 12/1994 | Robichaud | |
| 5,375,403 A | * | 12/1994 | Collins et al. | 56/330 |
| 5,735,740 A | * | 4/1998 | Tarasenko et al. | 460/97 |
| 5,974,772 A | * | 11/1999 | Chuksin et al. | 56/128 |
| 5,987,861 A | * | 11/1999 | Duncan et al. | 56/14.4 |
| 6,453,655 B2 | * | 9/2002 | Ferraris | 56/220 |

* cited by examiner

*Primary Examiner*—Robert E. Pezzuto
*Assistant Examiner*—Natham Mammen
(74) *Attorney, Agent, or Firm*—Antoinette M. Tease (57) ABSTRACT

An apparatus for harvesting the seed of native plant species with a cam mechanism that increases the zone of controlled brushing from a point of contact between the rotating brushes and combs to a four-inch span over which the rotating combs remain perpendicular to the surface of the brush while following an arc path nearly concentric to that of the brush shaft. The comb assembly consists of a belt stretched around a plurality of wheels and evenly spaced combs attached to the belt by a plurality of bars. The comb assembly pivots so that the distance between the rotating combs and rotating brushes can be adjusted to achieve maximum yield for a particular species. A method for harvesting native seeds using the harvester with the cam mechanism and adjustable comb assembly.

19 Claims, 5 Drawing Sheets

NATIVE SEED HARVESTER WITH CAM DESIGN

CROSS-REFERENCE TO RELATED APPLICATION

This application claims the benefit under 35 U.S.C. § 120 of U.S. Nonprovisional application Ser. No. 09/771,492, filed Jan. 26, 2001 (the "parent application") now U.S. Pat. No. 6,640,530. The contents of that application are hereby incorporated by reference into the present disclosure.

BACKGROUND OF THE INVENTION

1. Field of the Invention

The present invention relates generally to an apparatus and method for harvesting the seeds of native plant species, while maximizing the yield through an improved comb assembly design that includes a cam mechanism.

2. Description of the Related Art

Every year natural and man-caused disturbances (wildfire, construction of highways and facilities, mining, noxious weeds infestation, and overgrazing) damage and destroy millions of acres of native vegetation. These vast disturbances require restoration. Stewards of public lands, private landowners, and individuals and organizations concerned with environmental quality seek restoration of naturally occurring plant communities to provide forage, weed deterrence, water and nutrient management, wildlife habitat, and landscape stability.

Without restorative intervention, land recovery takes decades, leaving ecosystems vulnerable to erosion, invasive plant and insect species, and diseases. Long-term treatment plans call for reseeding native species, whose seed are often unavailable in the required quantities. Restoration is therefore constrained by limited supply and the high cost of the seed of native plant species. This unavailability of seed is frequently a direct result of seed characteristics that make it difficult to harvest sufficient quantities of viable seed. The present invention relates to a harvester that addresses the issue of difficult seed recovery by firmly removing ripe seeds from the seed heads of native plant species, while leaving unripe seeds.

The demand for novel and effective native seed harvesting equipment is directly linked to the increasing demand for difficult-to-harvest native seeds to be used in restoration of public and private lands. A principal reason for the limited availability of many species is that they do not lend themselves to conventional harvesting technologies. Many native plant species are only harvested by slow and inefficient hand collection, severely restricting supplies and increasing costs. Other species are subjected to traditional farm harvesting techniques that fail to maximize full harvest potential. There are currently four primary products and practices utilized in the harvest of native seeds, and they are discussed below.

A. Hand Harvesting

Hand harvesting can be as simple and inexpensive as having a cloth bag or pail for collecting seed, or it can involve use of a hand-held mechanical device. Hand harvesting achieves high seed recovery rates with good determination of ripe seed and may be the only feasible practice for very rough or sensitive terrain, wetlands, and small patches, but it is a slow and labor-intensive practice. For this reason, it is unsuitable for large-scale commercial production. The present invention is preferable to hand harvesting because it is much more productive and therefore much more commercially viable.

B. Direct Combining

Direct combining uses conventional harvest equipment. The combine cuts and threshes the plant to remove the seed and separate the seed from the other material that has been cut and collected. The seed is then conveyed into a hopper. The separated plant debris is deposited back onto the field. Combine equipment requires very precise adjustments, attachments and sometimes minor modifications to be suitable for a native seed crop. Because grass seed is similar in weight and structure to the chaff and other debris, some seed, especially immature seed, is not separated from the debris and is lost. Combines may also be used in combination with a stripper header. Stripper headers are not suitable for harvesting light native seeds and are only useful for heavy-seeded grains such as high-yield wheat, soybeans and rice. The prices of seed that can be easily harvested by combines (e.g., the wheatgrass and the wild ryes) are generally lower than the prices of other types of native seed because the seed that can be easily harvested by combines is more commonly available. The present invention is preferable over direct combining because it can successfully harvest the less common and more expensive native seed species that direct combining cannot effectively harvest.

Direct combining results in the harvest of seed of unwanted species and the commingling of that seed with the desired seed (i.e., contamination). Direct combining also results in the harvest of seed that has not ripened. Species that have indeterminate ripening processes are poor candidates for traditional combining because both ripe and immature seed is harvested. The immature seed is still in the process of filling and ripening, which reduces the vigor and even the viability of the immature seed, thereby wasting much of the potential seed crop. By virtue of the design of the present invention, it firmly removes ripe seed and leaves unripe seed undamaged to mature. A combine is not appropriate for sensitive environments or in small-sized and rough terrain, whereas the present invention is effective in those environments.

C. Combining Preceded by Windrowing

In windrowing, the native seed stalks are cut and left in the field to mature. After a number of days appropriate to the seed species, a combine with a pickup attachment collects and threshes the seed. This method is suitable for the portion of seed of indeterminate species that has matured enough that it can continue to fill and mature in the windrow for days after cutting, and it protects most of the seeds with a high tendency for shattering by virtue of the physical protection afforded by the windrow. The seed has a lower moisture content by the time threshing is completed, which lessens the need to further dry the seed.

While the grasses remain in windrows, however, the seed harvest is still somewhat vulnerable to damage by rain and wind. This method is not suitable for short grasses because of the difficulty of retrieving the swathed stalks. The windrowing must be followed by a combine with a swath pickup device to collect the swath of cut plants from the ground and to separate the seeds, which makes the windrowing method subject to some of the same contamination and separation problems as direct combining. The present invention is preferable to windrowing because it immediately collects mature seed with no possibility of shattering, leaves immature seed undamaged so it can fill and increase in vigor and mature to become more viable, and it also addresses the contamination and separation deficiencies involved with the use of the combine.

D. Stripping

Stripping involves removing the mature seed from the seed head while in the field, leaving the plant intact. Strippers to date have mostly involved rapidly rotating brushes or stationary combs. Simple brush strippers are used mostly with seeds that are lightweight and that have long awns or protuberances. All of the commercial brush strippers include a rotating brush with air inflow that pulls the seed into a collection chamber, but the treatment applied is highly uneven among plants. This results in as little as half or less of potential seed being recovered. Because the plant is not destroyed, seed recovery is increased by a second or even a third harvest on grasses that do not mature in a uniform fashion, for a higher yield than with single-pass harvesting (as in windrowing and combining). Commercially available strippers are loaded on the front end of, or are pulled behind, conventional farm equipment. Stripping can be particularly beneficial to crops that do not tolerate continual clipping of the growth tips as a combine or windrower does.

Strippers with only combs and no brushes are less expensive than brush strippers, but the percentage of seed recovered is often even lower than with the rotating brush strippers. Both types of currently used strippers have the disadvantage of not positively engaging the seed heads to remove the seed from the seed head. An added disadvantage is that they require the added time and labor costs of repeat passes over unevenly maturing fields. Both brush and comb strippers perform better than combining in addressing contamination and separation issues, however.

The present invention is an integrated brush and comb stripper that substantially increases the percentage of seed recovered by positively engaging the seed heads and delivering a controlled brush treatment to remove, capture and convey all mature seed to a hopper. The reason the harvest efficiency of brush strippers is not as high is because the stripper design relies solely on the brush action to dislodge the seed, which tends to cause some plant types to lean, be blown or be nudged away by the brush itself. Heavier seeds or improperly positioned seeds fall to the ground before the airflow vacuum can pull them into the hopper.

The present invention solves these problems by combining a brush with a comb assembly to maximize seed recovery, by providing for adjustment of the distance between the counter-rotating brushes and combs to maximize the yield for a particular species, by providing a uniform brushing treatment to all seed heads as they pass through a zone of evenly controlled brush treatment, by having seed dislodgement take place within the vacuum airflow, and by separately controlling the speed of the brush and the combs. By virtue of a unique cam design, the zone of controlled brushing is increased from a single point of contact to a controlled length of comb rotation. The use of the cam mechanism further increases yield and permits fine-tuned adjustments to provide the same treatment to all seed heads.

BRIEF SUMMARY OF THE INVENTION

This invention relates to an improvement of a harvester design that was described in the parent application. The parent application described a harvester with cooperating brushes and combs. The functions of the combs are to gather the seed heads for brushing, to direct the seed heads into the threshing zone (or the "zone of controlled brushing"), and to hold seeds that are separated from the plant and deliver them into the airflow that impels them into the accumulation chamber. The gathering function must handle the seed heads gently to minimize seed shatter loss. For that reason, the speed of the combs must be controlled independently from the brush speed, and the speed of the combs must be close to ground speed to prevent seed shatter loss ahead of the machine. The function of the brushes is to firmly remove the mature seeds.

This application describes an improvement to the invention covered by the parent application, namely, the addition of a cam mechanism that increases the zone of controlled brushing from a point of contact between the rotating brushes and combs to a specific length of span over which the rotating combs follow a path nearly concentric to that of the brush shaft. This application also describes an adjustable comb assembly design that allows the distance between the rotating brushes and the rotating combs to be increased or decreased to achieve maximum yield for any particular species.

The present invention claims an apparatus for harvesting the seed of native plant species that includes: a plurality of rotating combs; a plurality of rotating brushes; a cam mechanism that directs the rotating combs on a path that is nearly concentric to the shaft of the rotating brushes for a certain distance; and an accumulation chamber. The apparatus claims further contemplate that the speed of rotation of the brushes and the speed of rotation of the combs are separately powered and controlled; the combs and the brush rotate in opposite directions such that they are moving in the same direction at the interface with the plant; the rotating combs are mounted on a wide conveyor belt that is stretched around a plurality of wheels; the cam mechanism comprises two or more cam follower bearings; the height of the apparatus is adjustable to the height of the seed heads; the distance between the rotating combs and the rotating brushes is adjustable; the combs are evenly spaced on the belt; the certain distance over which the cam mechanism holds the combs perpendicular to the surface of the brush as they travel on a path that is nearly concentric to the shaft of the rotating brushes is up to ninety (90) degrees (or one-fourth) of the brush surface; and the brushes rotate at a speed faster than that of the combs. In the preferred embodiment, the number of wheels around which the belt is stretched is three, the combs are evenly spaced on the belt at approximately four inches apart, and the zone of controlled brushing where the rotating combs follow a path nearly concentric to the brush shaft is also approximately four inches long.

The present invention also claims a method for harvesting the seed of native plant species that includes using a harvester comprised of a plurality of counter-rotating combs and brushes; adjusting the height of the harvester to the height of the seed heads; gathering the seed heads with rotating combs; dislodging the seeds from the seed heads with the rotating brushes; using a cam mechanism to hold the combs perpendicular to the surface of the brush as they travel on a path that is nearly concentric to the shaft of the rotating brushes for a certain distance; and impelling the seeds into an accumulation chamber. The method claims further include rotating the brushes at a speed faster than that of the combs; adjusting the distance between the brushes and combs to achieve maximum yield; using a cam mechanism consisting of two or more cam follower bearings; evenly spacing the rotating combs; allowing the certain distance over which the cam mechanism holds the combs perpendicular to the surface of the brush as they travel on a path that is nearly concentric to the shaft of the rotating brushes to be up to ninety (90) degrees (or one-fourth) of the brush surface; and mounting the rotating combs on a belt that is stretched around a plurality of wheels.

BRIEF DESCRIPTION OF THE DRAWINGS

As shown in FIG. 1, in the preferred embodiment, there are three modules in the full brush and comb assembly.

DETAILED DESCRIPTION OF THE INVENTION

This application relates to certain improvements to the harvester described in the parent application. The improvements include: (1) an improved design for the comb assembly; (2) the addition of a cam mechanism that increases the amount of controlled brushing action given to each seed head; and (3) adjustment of the distance between the brushes and combs to achieve maximum seed recovery for a particular species. In addition, the height of the harvester is adjustable to the height of the seed heads. This latter adjustment can be made in a number of ways. In the preferred embodiment, the harvester is mounted on a front end loader, which can be raised or lowered with hydraulic controls. Other possible embodiments include raising or lowering the front end loader with electrical controls, or manufacturing the harvester as an independent pull-type unit with hydraulic or electrical height controls in the tractor cab. All of these improvements enhance the effectiveness of the harvester by increasing the percentage of seed recovery.

As described more specifically below, in the preferred embodiment, the comb assembly consists of a mounting plate at each end, three wheels attached to the mounting plates, and a wide conveyor belt that is supported by the wheels; the combs are attached to the belt by a series of bars on either side (i.e., the inside and outside) of the belt; and there are sixteen combs spaced approximately four inches apart on the belt. The cam mechanism consists of three cam follower bearings that are attached to the mounting plates and that overlap with the belt by approximately one inch to guide the belt. The mounting plates pivot to adjust precisely the distance between the brushes and combs.

Figure 1:
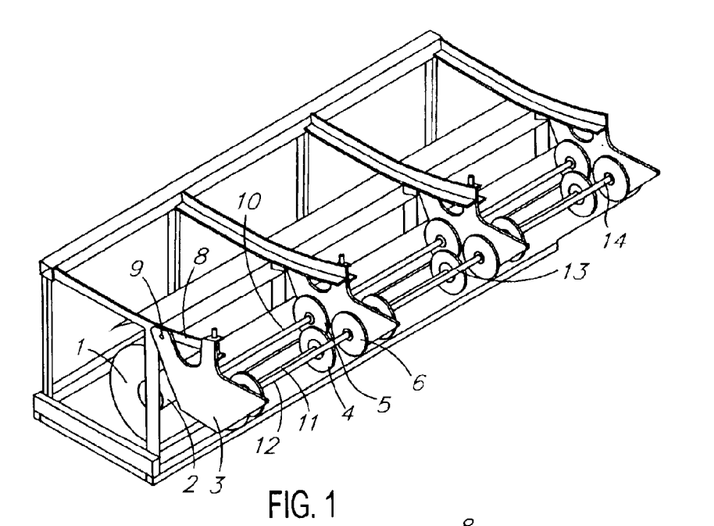
FIG. 1 is a front and right side view of the full brush and comb assembly.

FIG. 1 is a front and side view of the brush assembly and the comb assembly in the frame (also called "housing") without the belt. In the preferred embodiment, the entire assembly consists of three modules, but the present invention expressly contemplates that there could be as few or as many modules as a particular customer desires, and the modules could be of any length that accommodates the length of the brush. In the preferred embodiment, commercially available brushes are used because they are most cost-effective, but custom brushes could be used as well.

The brush assembly in one module consists of a brush 1 mounted on a rotating shaft 2. The brush shaft 2 is continuous through all of the modules. The comb assembly for a module has an end mounting plate 3. If a machine is more than one module wide, the mounting plate at one end of the module also serves as a mounting plate for the abutting module, such that there is always one more end mounting plate than the number of modules of the comb assembly. On the mounting plates are mounted three wheels 4, 5, 6 that support a stretched belt (not shown). Each mounting plate is attached to the housing 8 by a pivot 9 that allows the distance between the brush and comb assembly to be adjusted. The pivots for all of the mounting plates move together so that the distance between the brushes and combs is consistent across all of the modules. In the preferred embodiment, the rotating combs come into the desired close proximity but not actual contact with the rotating brushes.

One of the wheels in the comb assembly (in the preferred embodiment, it is the uppermost posterior wheel, defined below) is attached to a power source that causes the belt and wheels to rotate in a clockwise direction when viewed from the right-hand side of the machine. The wheel that is farthest from the brush 6 will be referred to herein as the "anterior" wheel because it is closest to the direction in which the harvester travels when in use. The term "posterior" will be used herein to describe the two wheels that are closest to the brush 4, 5. The shafts of the two posterior wheels 10, 11 are continuous, but the shafts of the anterior wheels 12, 13, 14 are not. The shafts of the anterior wheels 12, 13, 14 are discontinuous (i.e., there are separate shafts in each module rather than one continuous shaft) to provide tension on the belts individually and to allow for easier maintenance of the belts. The brush 1 rotates in a counterclockwise direction opposite to that of the belt.

Figure 2:
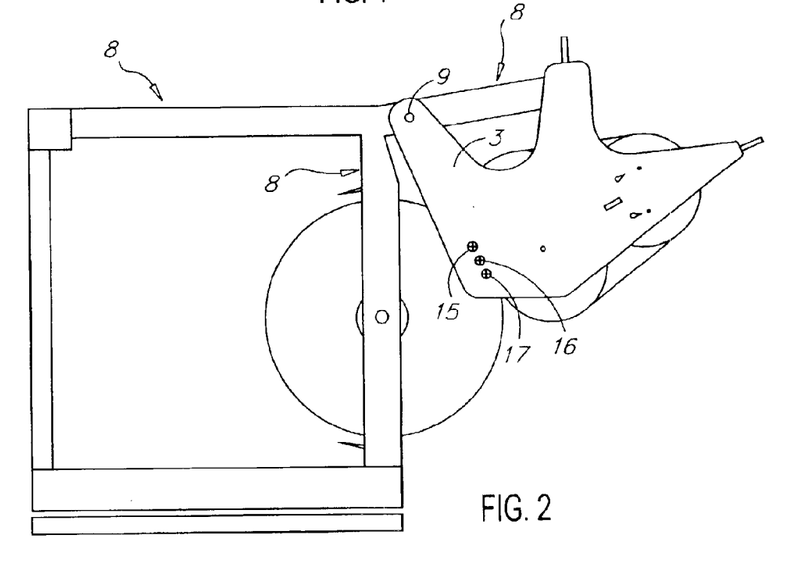
FIG. 2 is a side view of the brush and comb assembly including the mounting plate.

FIG. 2 is a side view of the brush and comb assembly including the mounting plate of the comb assembly. The mounting plate 3 is attached to a pivot 9 that allows the comb assembly to be moved closer to or farther away from the brush. The cam mechanism, which in the preferred embodiment consists of three cam follower bearings (not shown) is attached to the mounting plate with nuts and bolts 15, 16, 17. On the two outside mounting plates, the cam follower bearings are attached to only one side of the mounting plate (not shown in this figure). On the two inside mounting plates, the cam follower bearings are attached to both sides of the mounting plates (also not shown). This Figure also illustrates the housing 8.

Figure 3:
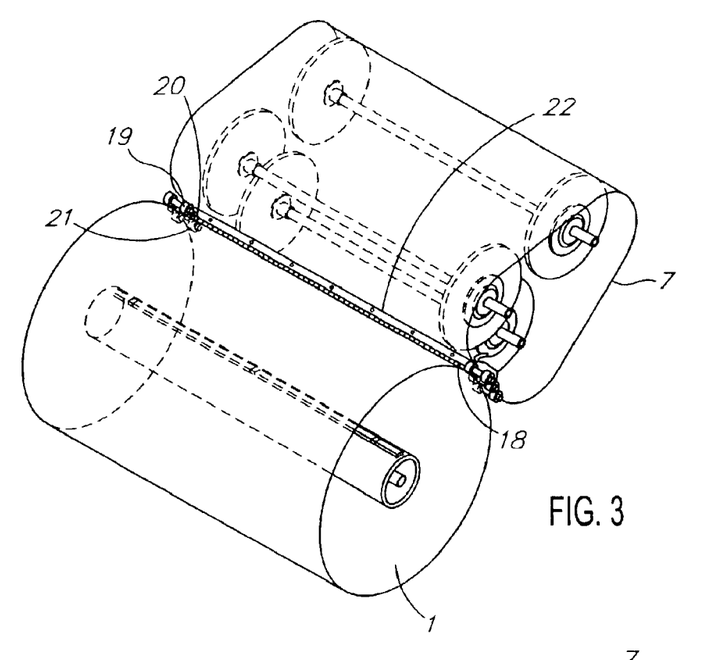
FIG. 3 is a top and side view of one module of the brush and comb assembly.

FIG. 3 is a top and side view of one module of the brush and comb assembly. Each comb 18 is attached to the belt by metal bars on either side (top and bottom) of the belt. The bars are optimized for size to minimize weight yet satisfy the stress load requirement. In the preferred embodiment, there are sixteen combs approximately four inches apart mounted on each belt. The three cam follower bearings 19, 20, 21 that constitute the cam mechanism overlap with the belt 7 by approximately one inch. The combs 18 are narrower than the belts by approximately one inch on each end so as to prevent the combs from hitting the cam follower bearings when the combs rotate with the belt. The bar on top of the belt (the "top bar") to which the comb attaches 22 is the same width as the comb so as to prevent the top bar 22 from hitting the cam follower bearings when the belt is rotating. The bar on the underside of the belt (the "bottom bar") (not shown) is the same width as the belt because there is no possibility of the bottom bar coming into contact with the cam follower bearings 19, 20, 21. The brush 1 is the same width as the belt 7. This design may cause uneven wear on the brush because there will be an area approximately one-inch long on either end of the brush that does not come into close proximity with the combs. An alternative but equivalent design that would alleviate this problem would be to use combs that are the same length as the belt and to undercut the combs to allow the cam follower bearings to pass underneath the combs as they rotate.

Figure 4:
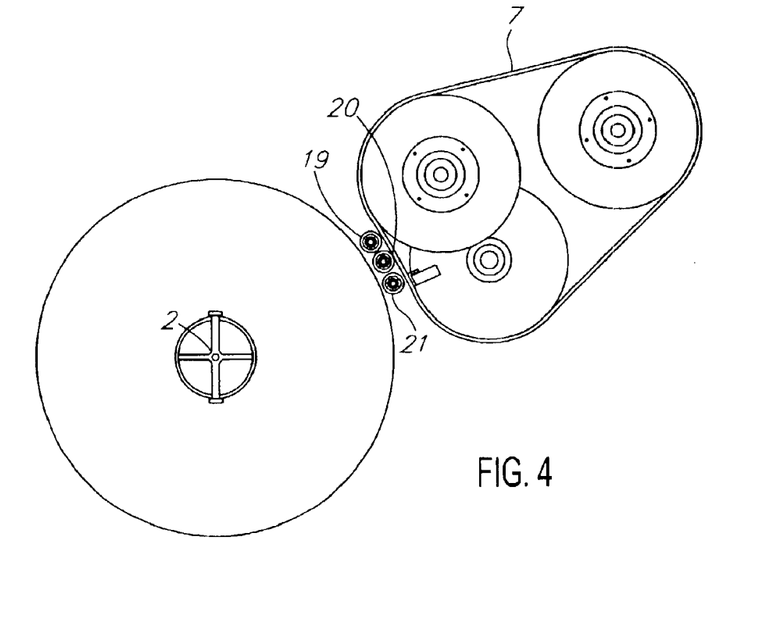
FIG. 4 is a side view of the brush and comb assembly without the mounting plate.

FIG. 4 is a side view of the brush and comb assembly without the mounting plate. This figure illustrates the position of the three cam follower bearings 19, 20, 21 with respect to the belt 7. As can be seen in this drawing, the function of the cam mechanism is to guide the belt to follow a path nearly concentric to the brush shaft 2, thereby increasing the distance over which the rotating combs are in close proximity with the rotating brushes.

Figure 5:
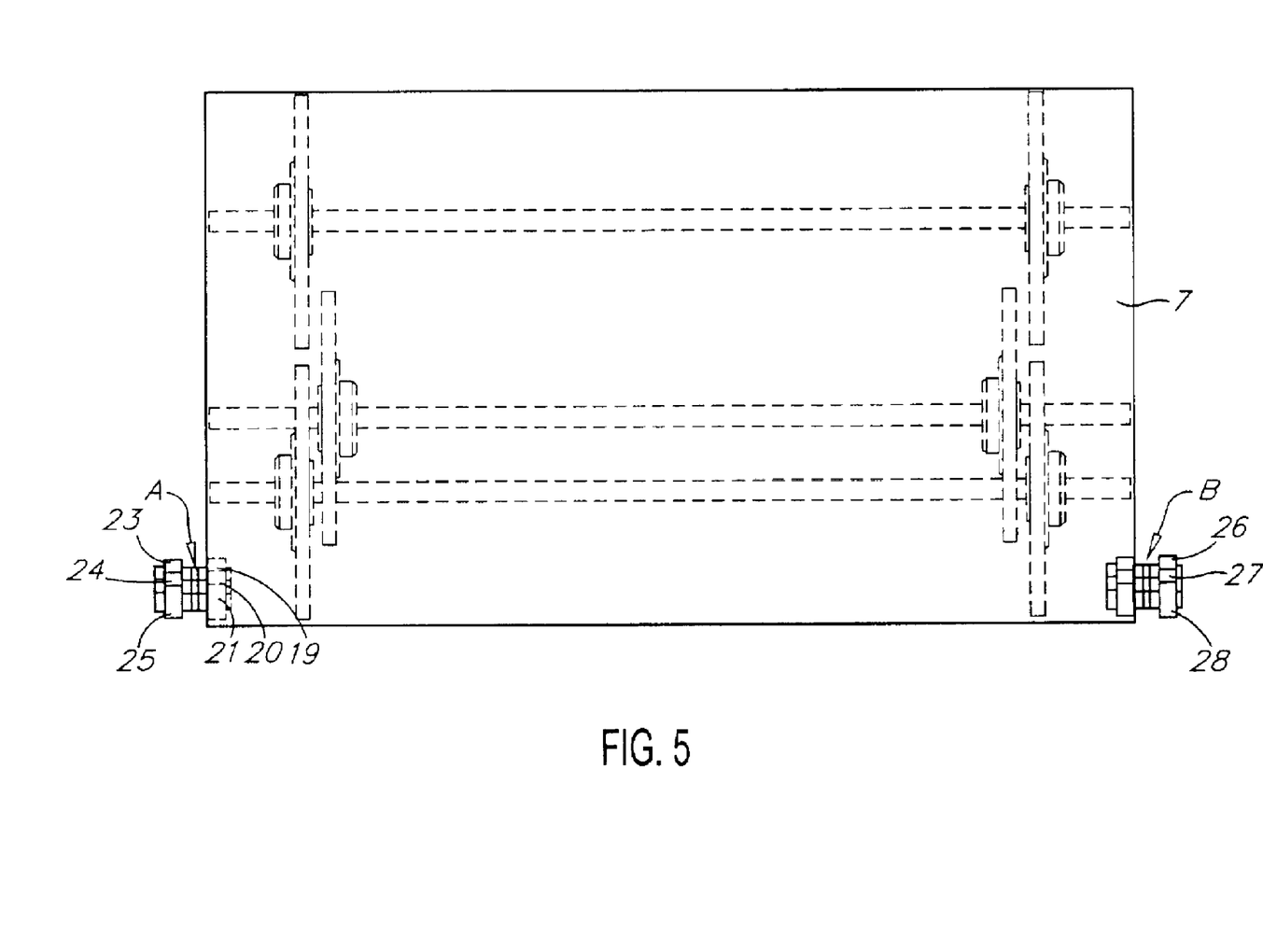
FIG. 5 is a front view of the comb assembly and cam mechanism with the belt.

FIG. 5 is a view from above of the comb assembly and cam mechanism with the belt. This drawing shows the position of the three cam follower bearings 19, 20, 21 in relation to the belt 7. This view is of the middle module of the comb assembly. The mounting plates attach at points A and B, and a second 23, 24, 25 and third 26, 27, 28 set of cam follower bearings are shown. The second and third sets of cam follower bearings guide the belts on either side of the belt shown in this figure.

Figure 6:
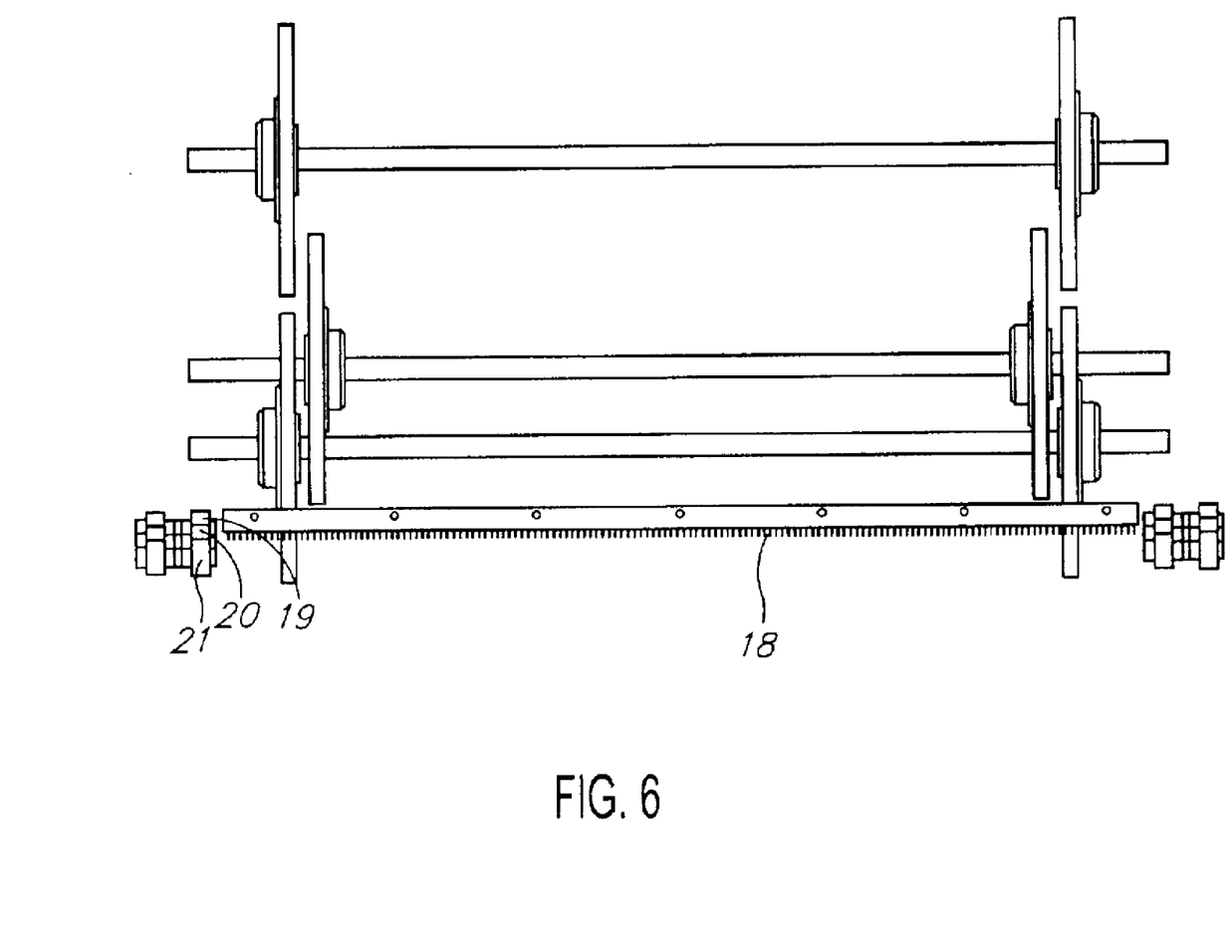
FIG. 6 is a front view of the comb assembly and cam mechanism without the belt.

FIG. 6 is the same view as in FIG. 5 but without the belt. As can be seen in FIG. 5, the cam follower bearings 19, 20, 21 overlap with the belt by a certain distance (one inch in the preferred embodiment). As can be seen in FIG. 6, the comb 18 is narrower than the belt to accommodate for the cam follower bearings.

Figure 7:
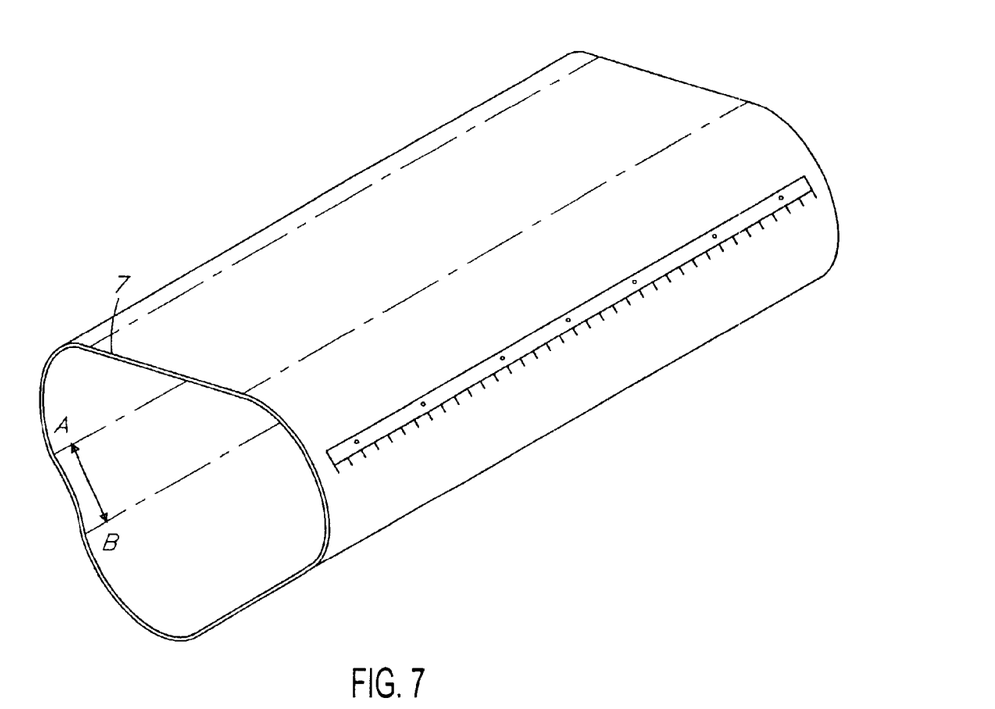
FIG. 7 is a drawing of the belt only illustrating the effect of the cam mechanism on the belt.

FIG. 7 is a drawing of the belt illustrating the effect of the cam mechanism on the belt. In the preferred embodiment, each belt 7 is 66 inches long by 40 inches wide, and there are 16 combs (only one is shown in this figure) attached to the belt at regular intervals of approximately four inches. The comb spacing is determined so that one or more combs 18 are in contact with each seed head during the entire time it is in the threshing zone. The zone of controlled brushing between the brushes and the combs is illustrated in this figure by the distance between points A and B. In the preferred embodiment, the distance between points A and B is also approximately four inches, but the present invention contemplates that the arc created by the cam mechanism could represent as much as ninety (90) degrees (or one-fourth) of the brush surface. In the preferred embodiment, a comb spacing of approximately four inches ensures that each seed head is held in contact with the brush as it travels through the approximately four-inch-long threshing zone.

The harvester with cam design described in this and the parent application is superior over existing art in at least four respects. First, it reduces the amount of seed that falls to the ground after being stripped from the plant because the vacuum airflow created by the rotating brushes and combs captures the seed and impels it into the accumulation chamber (which is depicted as reference number 50 in FIG. 1 of the parent application). Second, it increases the amount of seed harvested through better positioning of the seed heads. This is accomplished through the cooperating action of the brush and combs and further enhanced by the effect of the cam mechanism described in this application. Third, several parameters can be adjusted to allow for maximum yield for any particular species. Specifically, the machine height can be adjusted to accommodate for the wide range of seed stalk heights that is typical of native species; as explained above, the distance between the brush and combs can be adjusted; the brush and comb speeds can each be separately adjusted; different brush fibers of greater or lesser stiffness can be used to provide a more severe or more gentle striking action; and combs of different configurations can be used (e.g., different angles or shapes of the teeth on the combs). Fourth, the present invention reduces seed cleaning time and costs because it generally harvests only the seed and awn (if the particular species being harvested has an awn) and minimizes the harvest of any other parts of the seed head or other plant parts. The awns are later removed in a simple treatment process that is standard for seed harvested by all harvest treatments.

Although a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

DEFINITIONS

The term "awn" means a slender, bristlelike appendage found on the spikelets of many grasses.

The term "floret" means an individual flower or seed of a grass plant located above and/or within a pair of glumes.

The term "glume" means a scale-like bract at the base of a grass spikelet or floret.

The term "indeterminate" means having a seed ripening process that is not uniform or simultaneous in its completion.

The term "spikelet" means a single floret and its glumes or a series of two or more connected florets.

What is claimed is:

1. An apparatus for harvesting the seed of native plant species comprising:
    (a) a plurality of rotating combs;
    (b) a plurality of rotating brushes;
    (c) a cam mechanism that holds the rotating combs perpendicular to the brush surface and directs them on an arc path that is nearly concentric to the shaft of the rotating brushes for a certain distance; and
    (d) an accumulation chamber,
    wherein the combs are parallel to the brushes;
    wherein the rotating brushes dislodge seeds of native grasses from mature seed heads while leaving the immature seed heads undamaged,
    wherein the rotating brushes and combs create a vacuum airflow that captures the dislodged seeds and impels them into the accumulation chamber, and
    wherein dislodgement of the seeds takes place within the vacuum airflow.

2. The apparatus of claim 1, wherein the speed of rotation of the brushes and the speed of rotation of the combs are separately powered and controlled.

3. The apparatus of claim 1, wherein the combs and the brushes rotate in opposite directions.

4. The apparatus of claim 1, wherein the rotating combs are mounted on a wide conveyor belt that is supported by a plurality of wheels.

5. The apparatus of claim 1, wherein the cam mechanism comprises two or more cam follower bearings.

6. The apparatus of claim 1, further comprising a means for adjusting the height of the apparatus to the height of the seed heads.

7. The apparatus of claim 1, further comprising a means for adjusting the distance between the rotating combs and the rotating brushes.

8. The apparatus of claim 1, wherein the rotating combs are parallel to the rotating brushes and evenly spaced.

9. The apparatus of claim 1, wherein the certain distance is up to ninety (90) degrees (or one-fourth) of the brush surface.

10. The apparatus of claim 3, wherein the brush rotates at a speed faster than that of the combs.

11. The apparatus of claim 4, wherein the number of wheels is three.

12. A method of harvesting the seed of native plant species comprising:
   (a) using a harvester comprising a plurality of counter-rotating combs and brushes;
   (b) adjusting the height of the harvester to the height of the seed heads;
   (c) gathering the seed heads with the rotating combs;
   (d) dislodging the seeds from the seed heads with the rotating brushes;
   (e) using a cam mechanism to hold the rotating combs perpendicular to the brush surface and direct them on an arc path that is nearly concentric to the shaft of the rotating brushes for a certain distance; and
   (f) impelling the seeds into an accumulation chamber,
   wherein the combs are parallel to the brushes;
   wherein the rotating brushes dislodge seeds of native grasses from mature seed heads while leaving the immature seed heads undamaged,
   wherein the rotating brushes and combs create a vacuum airflow that captures the dislodged seeds and impels them into the accumulation chamber, and
   wherein dislodgement of the seeds takes place within the vacuum airflow.

13. The method of claim 12, further comprising rotating the brushes at a speed faster than that of the combs.

14. The method of claim 12, further comprising adjusting the distance between the rotating brushes and combs to achieve maximum yield.

15. The method of claim 12, wherein the cam mechanism comprises two or more cam follower bearings.

16. The method of claim 12, wherein the rotating combs are parallel to the rotating brushes and evenly spaced.

17. The method of claim 12, wherein the certain distance is up to ninety (90) degrees (or one-fourth) of the brush surface.

18. The method of claim 12, wherein the rotating combs are mounted on a wide conveyor belt that is supported by a plurality of wheels.

19. The method of claim 18, wherein the number of wheels is three.

* * * * *